United States Patent
Kim et al.

(10) Patent No.: US 11,057,425 B2
(45) Date of Patent: Jul. 6, 2021

(54) APPARATUSES FOR OPTIMIZING RULE TO IMPROVE DETECTION ACCURACY FOR EXPLOIT ATTACK AND METHODS THEREOF

(71) Applicant: KOREA INTERNET & SECURITY AGENCY, Jeollanam-do (KR)

(72) Inventors: Mi Joo Kim, Jeollanam-do (KR); Woong Go, Jeollanam-do (KR); Hong Geun Kim, Jeollanam-do (KR); Sung Taek Oh, Jeollanam-do (KR); Jae Hyuk Lee, Jeollanam-do (KR); Soon Tai Park, Jeollanam-do (KR)

(73) Assignee: KOREA INTERNET & SECURITY AGENCY, Jeollanam-Do (KR)

( * ) Notice: Subject to any disclaimer, the term of this patent is extended or adjusted under 35 U.S.C. 154(b) by 0 days.

(21) Appl. No.: 16/844,984

(22) Filed: Apr. 9, 2020

(65) Prior Publication Data

US 2021/0168169 A1 Jun. 3, 2021

(30) Foreign Application Priority Data

Nov. 25, 2019 (KR) .......................... 10-2019-0152543

(51) Int. Cl.
*H04L 29/06* (2006.01)
(52) U.S. Cl.
CPC ...... *H04L 63/1466* (2013.01); *H04L 63/1416* (2013.01); *H04L 63/1425* (2013.01); *H04L 63/1433* (2013.01); *H04L 63/20* (2013.01)
(58) Field of Classification Search
CPC .......... G06F 21/60; G06F 21/55; G06F 21/56; H04L 29/06877; H04L 29/06884;
(Continued)

(56) References Cited

U.S. PATENT DOCUMENTS

| | | | |
|---|---|---|---|
| 6,601,048 B1 * | 7/2003 | Gavan | H04J 3/175 379/111 |
| 10,121,000 B1 * | 11/2018 | Rivlin | G06F 21/552 |

(Continued)

FOREIGN PATENT DOCUMENTS

| | | |
|---|---|---|
| KR | 10-0656351 B | 12/2006 |
| KR | 10-2009-0071502 A | 7/2009 |

(Continued)

OTHER PUBLICATIONS

H. Liu and M. S. Kim, "Real-Time Detection of Stealthy DDoS Attacks Using Time-Series Decomposition," 2010 IEEE International Conference on Communications, 2010, pp. 1-6, doi: 10.1109/ICC.2010.5501975. (Year: 2010).*

*Primary Examiner* — Saleh Najjar
*Assistant Examiner* — Khalid M Almaghayreh
(74) *Attorney, Agent, or Firm* — Sheppard Mullin Richter & Hampton LLP

(57) ABSTRACT

An apparatus comprising a processor to execute the rule optimizer to perform a number of operations. One operation comprises obtaining 5 log data including a result of detecting an exploit attack based on a rule. Another operation comprises time-series analyzing the obtained log data to update at least some of previously applied detection rules. There is provided an apparatus for automatically optimizing a rule to improve the detection accuracy for an exploit attack in a rule-based attack detection system, and a method performed on the apparatus.

17 Claims, 22 Drawing Sheets

(58) Field of Classification Search
CPC ......... H04L 29/06911; H04L 29/06931; H04L 29/06918
USPC ................ 726/22–25; 713/188, 500–502
See application file for complete search history.

(56) References Cited

U.S. PATENT DOCUMENTS

| | | | | |
|---|---|---|---|---|
| 10,389,738 B2* | 8/2019 | Muddu | ................ | G06F 16/285 |
| 2003/0110396 A1* | 6/2003 | Lewis | ................ | H04L 63/1458 |
| | | | | 726/4 |
| 2006/0017557 A1* | 1/2006 | Chung | ................ | H04L 63/1408 |
| | | | | 340/515 |
| 2008/0256230 A1* | 10/2008 | Handley | ............... | H04L 63/145 |
| | | | | 709/224 |
| 2010/0017870 A1* | 1/2010 | Kargupta | ........... | H04L 63/1408 |
| | | | | 726/14 |
| 2010/0251370 A1* | 9/2010 | Sun | ....................... | G06F 21/554 |
| | | | | 726/23 |
| 2011/0295783 A1* | 12/2011 | Zhao | ..................... | G06F 16/337 |
| | | | | 706/12 |
| 2013/0007708 A1* | 1/2013 | Sakaki | ..................... | G06F 8/10 |
| | | | | 717/120 |
| 2013/0173621 A1* | 7/2013 | Kapoor | .................. | H04W 4/70 |
| | | | | 707/737 |
| 2014/0082730 A1* | 3/2014 | Vashist | .................. | H04L 67/22 |
| | | | | 726/23 |
| 2015/0058982 A1* | 2/2015 | Eskin | .................. | H04L 63/1425 |
| | | | | 726/23 |
| 2015/0113646 A1* | 4/2015 | Lee | ........................ | G06F 21/554 |
| | | | | 726/23 |
| 2015/0150132 A1* | 5/2015 | Lee | ..................... | H04L 63/1441 |
| | | | | 726/23 |
| 2015/0326589 A1* | 11/2015 | Smith | ..................... | H04L 63/02 |
| | | | | 726/1 |
| 2016/0065534 A1* | 3/2016 | Liu | ..................... | H04L 61/1511 |
| | | | | 707/728 |
| 2016/0226901 A1* | 8/2016 | Baikalov | ............ | H04L 63/1433 |
| 2016/0261622 A1* | 9/2016 | Danielson | ........... | H04L 67/1095 |
| 2017/0063888 A1* | 3/2017 | Muddu | ................. | G06F 3/04847 |
| 2018/0357422 A1* | 12/2018 | Telang | .................. | G06F 21/577 |
| 2019/0042745 A1* | 2/2019 | Chen | ...................... | G06F 21/552 |
| 2019/0130101 A1* | 5/2019 | Chen | ...................... | G06N 20/00 |
| 2019/0349356 A1* | 11/2019 | McElwee | ............ | G06F 21/552 |

FOREIGN PATENT DOCUMENTS

| | | |
|---|---|---|
| KR | 10-2011-0035582 A | 4/2011 |
| KR | 10-1765828 B | 5/2014 |
| KR | 10-2016-0131619 A | 11/2016 |
| KR | 10-2017-0046001 A | 4/2017 |
| KR | 10-2019-0101690 A | 9/2019 |

* cited by examiner

FIG. 9

| dev_name | dev_vendor | CVE number | CVE info | EDB number | Exploit info | Exploit file |

| GPON Router | Dasan | CVE-2018-10561 | ... | 44576 | ... | Exploit file |

64

```
#!/bin/bash
echo "[+] Sending the Command..."
# We send the commands with two modes backtick (`) and semicolon (;) because different models trigger on different devices
curl -k -d "XWebPageName=diag&diag_action=ping&wan_conlist=0&dest_host=₩`$2₩`;$2&ipv=0" $1/GponForm/diag_Form?images/ 2>/dev/null 1>/dev/null
echo "[+] Waiting...."
sleep 3
echo "[+] Retrieving the ouput..."
curl -k $1/diag.html?images/ 2>/dev/null | grep 'diag_result = ' | sed -e 's/₩₩n/₩n/g'
```

| Rule Header | | | | | | |
|---|---|---|---|---|---|---|
| action | protocol | Src IP | Src port | direction | Dst IP | Dst port |
| Rule option | | | | | | |
| msg | ... | ... | reference | classtype | sid | rev |

| Action | meaning |
|---|---|
| Pass | passing a packet |
| Drop/Reject | dropping a packet, logging |
| Alert | passing a packet, logging |

FIG. 14

```
44576_201810561
alert tcp $EXTERNAL_NET any -> $HOME_NET any ( msg:"Authentication Bypass / Botnet / Dasan - GPON Router / Router"; content:"/GponForm/diag_Form?images/"; nocase; classtype: Authentication-Bypass_Authenticated-less; reference: cve, CVE-2018-10561; sid:20000014; )
```

| timestamp | gid | sid | rev | msg | classtype | priority |
|---|---|---|---|---|---|---|
| protocol | Src IP | Src port | direction | Dst IP | Dst port | |

FIG. 17

10/15/2019-16:08:59.380690 [] [1:20000014:0] Authentication Bypass / Botnet / Dasan - GPON Router / Router [] [Classification: Authentication-Bypass_Authenticated-less] [Priority: 1] {TCP} 192.168.1.92:51136 -> 192.168.1.99:8000

APPARATUSES FOR OPTIMIZING RULE TO IMPROVE DETECTION ACCURACY FOR EXPLOIT ATTACK AND METHODS THEREOF

CROSS-REFERENCE TO RELATED APPLICATION

This application claims priority from Korean Patent Application No. 10-2019-0152543 filed on Nov. 25, 2019 in the Korean Intellectual Property Office, and all the benefits accruing therefrom under 35 U.S.C. 119, the contents of which in their entirety are herein incorporated by reference.

BACKGROUND

1. Technical Field

The present disclosure relates to an apparatus for optimizing a rule to improve detection accuracy for an exploit attack and a method thereof. More specifically, it relates to an apparatus for optimizing a detection rule to improve the detection accuracy and detection speed of a system that detect an exploit attack based on a rule, and a method performed on the apparatus.

2. Description of the Related Art

Exploit means procedures, sequences of commands, scripts, programs, specific pieces of data designed to perform an attacker's intended behavior using design flaws, such as computer software or hardware bugs, or security vulnerabilities, or attacks using them. An exploit attack uses bugs or vulnerabilities such as software or hardware, and thus, it is relatively large. The exploit attack is characterized by indiscriminate attacks on specific targets, and on unspecified masses, causing massive economic damage. Therefore, it is very important to detect the exploit attack accurately. Improving the detection performance of the exploit attack is also one of important topics in the field of information security.

Most attack detection systems (or intrusion detection systems) proposed so far detect exploit attacks based on predefined rules. More specifically, when a system administrator who is an information security expert manually defines and sets a rule, attack detection is performed according to the set rule. In addition, the system administrator periodically updates the rule to maintain the system's performance (or the security of a domain to which an attack detection system is applied).

However, in the method above, the system performance cannot be objectively guaranteed because rule setting and optimization is overly dependent on the administrator's experience. In addition, since the rule setting and optimization is performed manually by the administrator, considerable human and time costs are incurred. In addition, when the administrator's experience is insufficient, rule updates may not be made in a timely manner or the rule is not be optimized so that the detection performance (e.g., accuracy) and the detection speed of the exploit attack may be reduced.

Therefore, there is a need for a research on a method for automatically performing rule optimization to ensure the detection performance of the attack detection system objectively, and to improve the detection performance and detection speed thereof.

SUMMARY

Aspects of the present disclosure provide an apparatus for automatically optimizing a rule to improve the detection accuracy for an exploit attack in a rule-based attack detection system, and a method performed on the apparatus. For example, the apparatus may comprise a memory to store a rule optimizer. The apparatus may also include a processor to execute the rule optimizer to perform a number of operations. One operation may include obtaining log data including a result of detecting an exploit attack based on a rule. One operation may include time-series analyzing the obtained log data to update at least some of previously applied detection rules.

Aspects of the present disclosure provide an apparatus for optimizing a rule. The apparatus may include a memory to store a rule optimizer. The apparatus may also include a processor to execute the rule optimizer to perform a number of operations. One operation may include obtaining information on a device belonging to a target domain. One operation may include determining an exploit attack associated with the device by using the obtained information on the device. One operation may include updating an existing rule set of the target domain with a rule set for detecting the determined exploit attack.

Aspects of the present disclosure provide a method for optimizing a rule. The method may be performed by a computing device. The method may include obtaining log data including a result of detecting an exploit attack based on a rule, time-series analyzing the obtained log data, and updating at least some of previously applied detection rules by using a result of the time-series analysis.

Aspects of the present disclosure also provide an apparatus for automatically optimizing a rule to improve the detection speed for an exploit attack in a rule-based attack detection system, and a method performed on the apparatus.

Aspects of the present disclosure also provide an apparatus for optimizing a rule in an automated way without relying on an administrator to ensure that the detection performance of a rule-based attack detection system may be objectively secured, and a method performed on the apparatus.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided an apparatus for optimizing a rule comprises a rule optimizer for obtaining log data including a result of detecting an exploit attack based on a rule, and time-series analyzing the obtained log data to update at least some of previously applied detection rules.

BRIEF DESCRIPTION OF THE DRAWINGS

The above and other aspects and features of the present disclosure will become more apparent by describing in detail exemplary embodiments thereof with reference to the attached drawings, in which:

FIGS. 9 and 10 show types and examples of collected information that may be referenced in various embodiments of the present disclosure;

FIGS. 12 to 14 shows formats and examples of a detection rule that may be referenced in various embodiments of the present disclosure;

FIGS. 16 and 17 show formats and examples of log data that may be referenced in various embodiments of the present disclosure;

DETAILED DESCRIPTION OF THE EMBODIMENTS

Figure 1:
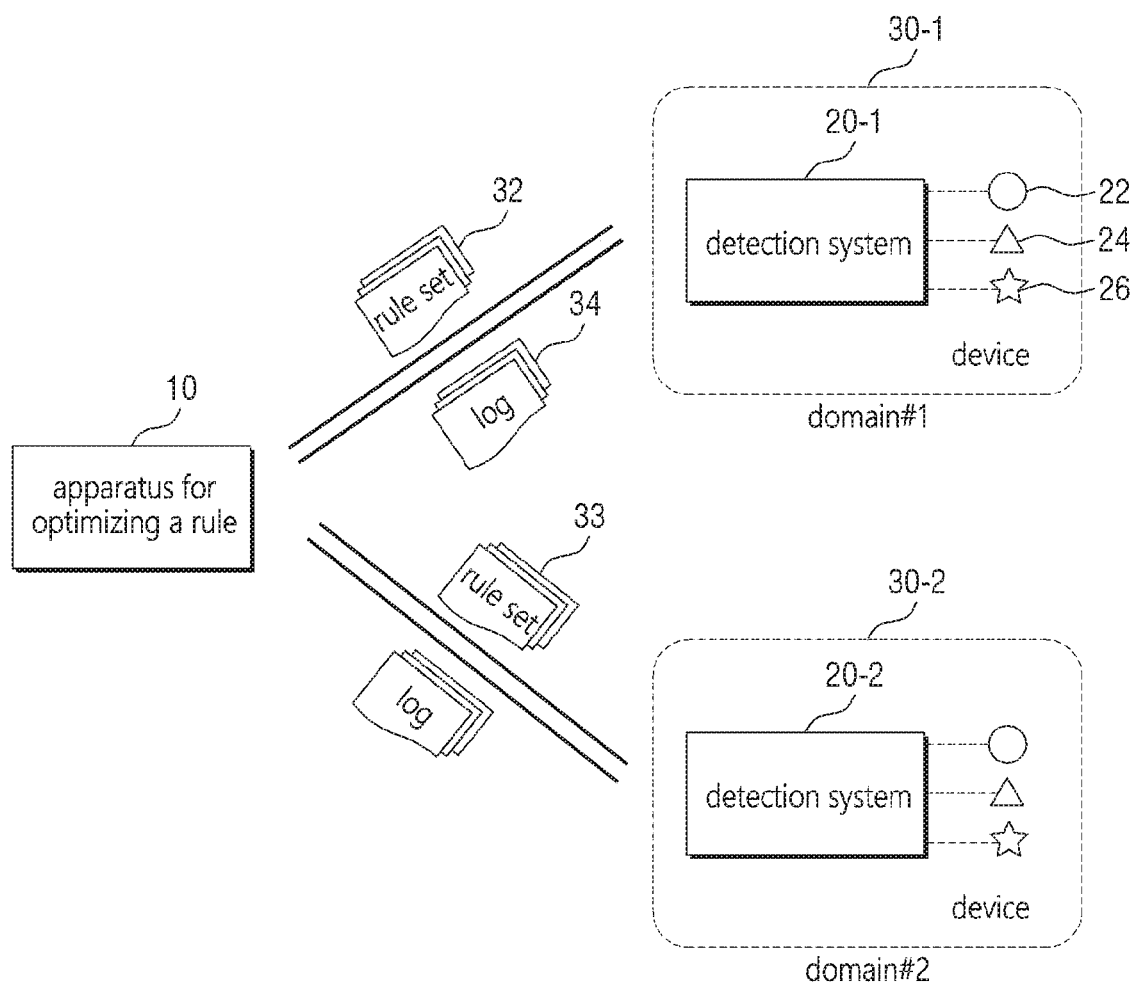
FIG. 1 shows an example environment in which an apparatus for optimizing a rule may be applied, according to some embodiments of the present disclosure.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure may be defined by the appended claims.

In adding reference numerals to the components of each drawing, it should be noted that the same reference numerals are assigned to the same components as much as possible even though they are shown in different drawings. In addition, in describing the presently disclosed concept, based on determining that the detailed description of the related well-known configuration or function may obscure the gist of the presently disclosed concept, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing embodiments and is not intended to be limiting of the presently disclosed concept. In this specification, the singular also includes the plural unless specifically stated otherwise in the phrase.

In addition, in describing the component of this presently disclosed concept, terms, such as first, second, A, B, (a), (b), can be used. These terms may be for distinguishing the components from other components, and the nature or order of the components is not limited by the terms. Based on a component being described as being "connected," "coupled" or "contacted" to another component, that component may be directly connected to or contacted with that other component, but it should be understood that another component also may be "connected," "coupled" or "contacted" between each component.

Hereinafter, some embodiments of the presently disclosed concept will be described in detail with reference to the accompanying drawings.

FIG. 1 shows an example environment in which an apparatus for optimizing a rule 10 may be applied, according to some embodiments of the present disclosure. FIG. 1 shows that the apparatus for optimizing the rule 10 may be applied to two domains 30-1 and 30-2. However, this may just be for convenience of understanding, and the number of domains may vary. In addition, the apparatus for optimizing the rule 10 may be applied to a single domain.

As shown in FIG. 1, the apparatus for optimizing the rule 10 may be applied to one or more domains 30-1 and 30-2 to optimize a rule (or rule set) for detecting an exploit attack. For example, the apparatus for optimizing the rule 10 may provide a rule set 32 to an attack detection system 20-1, and optimize the provided rule set 32 using log data 34 including an attack detection result. A method for performing the optimization by the rule optimization apparatus 10 will be described in detail with reference to FIG. 2 and the subsequent drawings.

Hereinafter, for convenience of description, the apparatus for optimizing the rule 10 will be abbreviated as an optimization apparatus 10, and the attack detection system 20-1 or 20-2 will be abbreviated as a detection system 20-1 or 20-2. In addition, based on a plurality of detection systems 20-1 and 20-2 being collectively referred to, or any attack system 20-1 or 20-2 being referred to, reference numeral "20" may be used. Similarly, based on a plurality of domains 30-1 and 30-2 being collectively referred to, or any domain 30-1 or 30-2 being referred to, reference numeral "30" may be used.

The apparatus for optimizing the rule 10 or the detection system 20 may be implemented with one or more computing devices. For example, all functions of the apparatus for optimizing the rule 10 may be implemented in a single computing device. As another example, a first function of the rule optimization apparatus 10 may be implemented in a first computing device, and a second function may be implemented in a second computing device. Here, the computing device may be a laptop, a desktop, or the like. However, it may not be limited thereto and may include any kind of device equipped with a computing function. However, based on the apparatus for optimizing the rule 10 being an environment that may optimize a plurality of rule sets in conjunction with various domains 30, it may be desirable to implement the apparatus for optimizing the rule 10 as a high performance server class computing device. See FIG. 24 for an example of the computing device.

The domain 30 may be an area that may be divided or defined according to logical or physical criteria, and the domain 30 may include one or more devices (e.g., 22-26) and the detection system 20. For example, a first domain 30-1 may include a detection system 20-1 that detects an exploit attack against one or more devices 22 to 26.

The domain 30 may be defined by an administrator, and may be automatically determined based on the number or type of the devices (e.g., 22 to 26). For example, a predetermined number of devices (e.g., 22 to 26) may be included in the domain 30, and a new domain may be dynamically formed based on the number of devices exceeding a reference value. There may be a plurality of subdomains in the domain 30.

The detection system 20 may detect an exploit attack against a device (e.g., 22 to 26) belonging to the domain 30 based on a rule. For example, the first detection system 20-1 may detect an exploit attack against the devices 22 to 26 belonging to the first domain 30-1 using the first rule set 32. In addition, the second detection system 20-2 may detect an exploit attack on a device belonging to the second domain 30-2 using a second rule set 33. Here, at least some of the first rule set 32 and the second rule set 33 may be configured with different rules. This may be because the apparatus for optimizing the rule 10 optimizes the rules depending on characteristics of each domain 30-1 and 30-2.

In addition, the detection system 20 may log an attack detection result and provide log data (e.g., 34) including the same to the optimization apparatus 10. The provided log data (e.g., 34) may be used for rule optimization. Detailed configuration and operation of the detection system 20 will be described later with reference to FIG. 5.

In some embodiments, the optimization apparatus 10 and the domain 30, precisely the detection system 20, may communicate over a network. The network may be implemented as any type of wired/wireless network such as a Local Area Network (LAN), a Wide Area Network (WAN), a mobile radio communication network, a Wireless Broadband Internet (Wibro), or the like.

FIG. 1 merely shows an embodiment for achieving the purpose of the present disclosure, and some components may be added or deleted. In addition, the components of the exemplary environment shown in FIG. 1 may be functional elements that are functionally divided. It may be noted that a plurality of components may be implemented in a form in which they may be integrated with each other in an actual physical environment. For example, the apparatus for optimizing the rule 10 and the detection system 20 may be implemented in different types of logic in the same computing device.

Up to now, reference has been made to the example environment in which the optimization apparatus 10 according to some embodiments of the present disclosure may be applied. Hereinafter, the configuration and operation of the optimization apparatus 10 and the detection system 20 will be described with reference to FIGS. 2 to 5.

Figure 2:
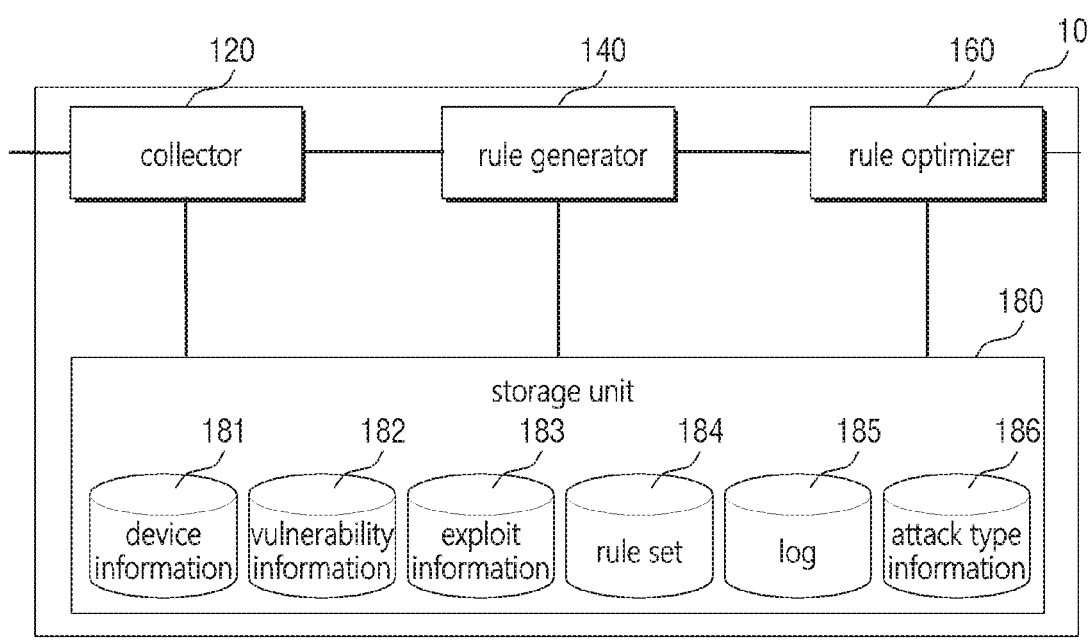
FIGS. 2 to 4 are exemplary block diagrams explaining an apparatus for optimizing a rule according to some embodiments of the present disclosure.

FIG. 2 may be an exemplary block diagram illustrating the optimization apparatus 10 according to some embodiments of the present disclosure.

As shown in FIG. 2, the optimization apparatus 10 may include a collector 120, a rule generator 140, a rule optimizer 160, and a storage unit 180. FIG. 2 illustrates the components related to an embodiment of the present disclosure. It will be appreciated by those skilled in the art that it may further include other general purpose components in addition to the components illustrated in FIG. 2. In addition, it may be noted that each component of the optimization apparatus 10 shown in FIG. 2 represents functionally divided functional elements, and a plurality of components may be implemented in a form that may be integrated with each other in the actual physical environment. Hereinafter, each component will be described.

The collector 120 collects various information for generating and/or optimizing a rule. For example, the collector 120 may collect information on a device (e.g., a name, a manufacturer, an operating system, firmware, etc.), vulnerability information on the device (e.g., CVE information), exploit information, or the like.

The collector 120 may collect information in any manner. For example, the collector 120 may collect information through web crawling. As another example, the collector 120 may receive information from a file or an input device.

Figure 3:
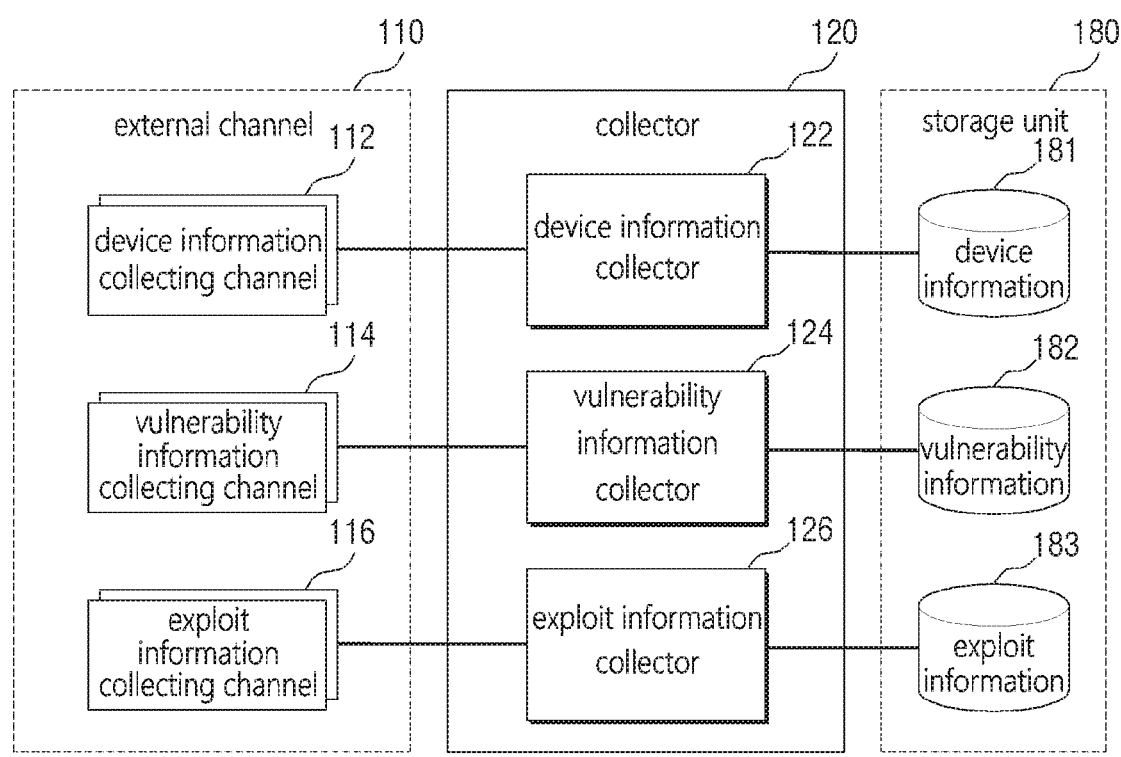

In some embodiments, as shown in FIG. 3, the collector 120 may include a device information collector 122, a vulnerability information collector 124, and an exploit information collector 126. Each information collector 122 to 126 may collect device information, vulnerability information, and exploit information from an external channel 110. The collected information may be stored and managed through the storage unit 180. Hereinafter, the operation of each collector 122 to 126 will be briefly further described.

The device information collector 122 may collect the device information through one or more device information collecting channels 112. The collected device information may be stored in a device information storage 181 through the storage unit 180. The device information collecting channel 112 may be, for example, a device manufacturer's website, but the scope of the present disclosure is not limited thereto. The device information may include, for example, general information on the device such as a name of the device, a manufacturer, an operating system type, an operating system version, a firmware type, a firmware version, or the like.

Next, the vulnerability information collector 124 may collect vulnerability information through one or more vulnerability information collecting channel 114. The collected vulnerability information may be stored in a vulnerability information storage 182 through the storage unit 180. The vulnerability information collecting channel 114 may be, for example, a vulnerability information posting site such as a National Vulnerabilities Database (NVD) or VulDB, a website of a device manufacturer that publishes vulnerability information, or the like. However, the scope of the present disclosure is not limited thereto. The vulnerability information may include, for example, Common Vulnerability and Exposures (CVE) information. CVE information includes information such as Common Vulnerabilities and Exposures IDentifier (CVE-ID), Overview of vulnerabilities, Common Vulnerability Scoring System (CVSS), Common Platform Enumeration (CPE), Common Weakness Enumeration (CWE), or the like. Since it is obvious to those skilled in the art, the description of the CVE information itself will be omitted.

Next, the exploit information collector 126 may collect exploit information through one or more exploit collecting channels 116. The collected exploit information may be stored in an exploit information storage 183 through the storage unit 180. The exploit collecting channel 116 may be, for example, an Exploit DataBase (EDB) website, but the scope of the present disclosure is not limited thereto. The exploit information may include, for example, exploit codes, exploit attack types, related vulnerability information, or the like.

It will be described with reference to FIG. 2 again.

The rule generator 140 may generate a rule for detecting an exploit attack based on the collected information. For example, the rule generator 140 may analyze the exploit code to classify the type of the exploit attack, or extract a signature or detection pattern for detecting the exploit attack. In addition, the rule generator 140 may generate a detection rule based on the classified attack type and an analysis result (e.g., a signature, a detection pattern, etc.). In order to exclude the duplicated description, a more detailed description of the operation of the rule generator 140 will be described later with reference to FIGS. 6 to 14.

Next, the rule optimizer 160 may optimize a rule (or rule set) based on log data including the attack detection result and/or information of devices belonging to the domain 30.

Figure 4:
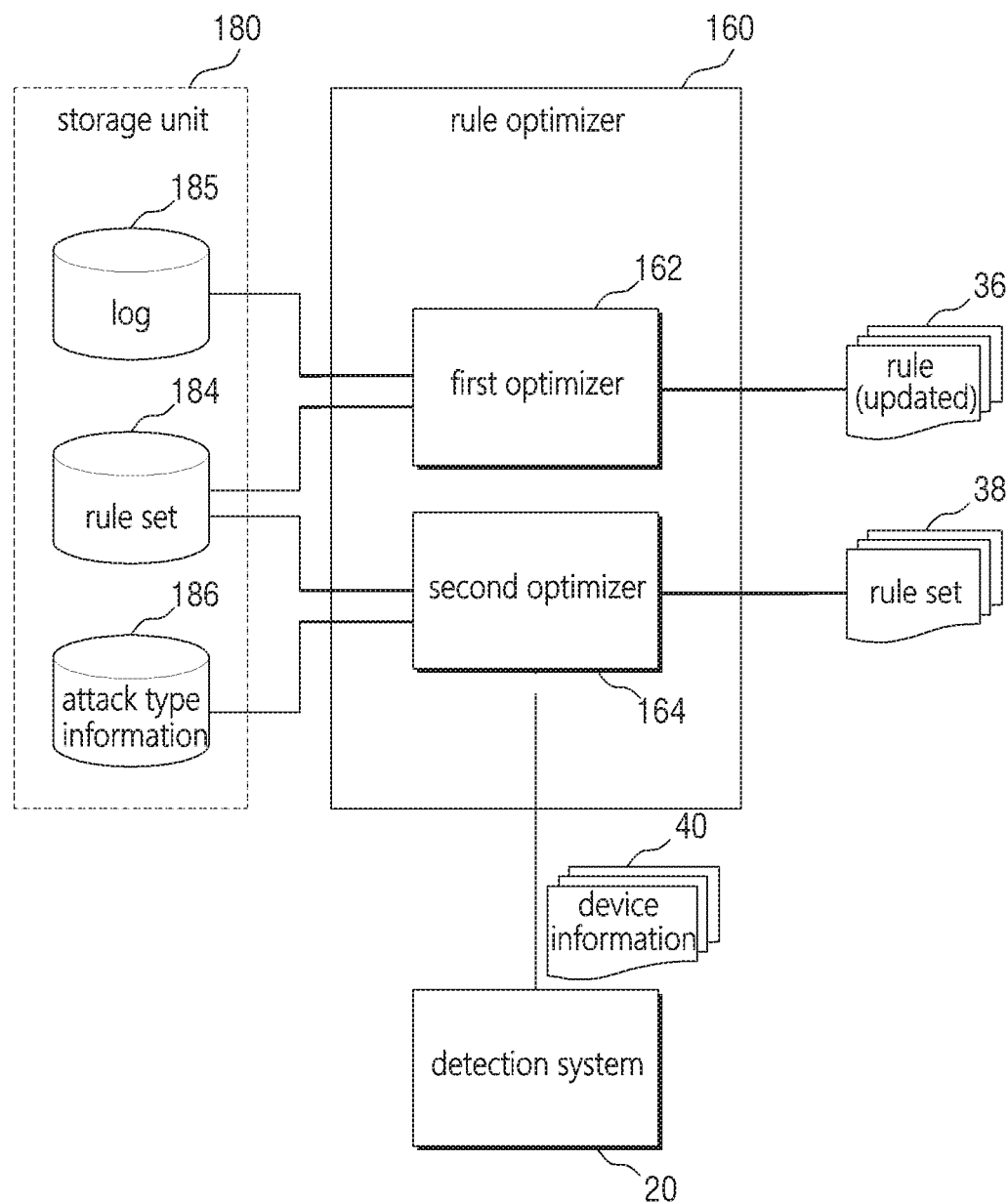

In some embodiments, as shown in FIG. 4, the rule optimizer 160 may include a first optimizer 162 and a second optimizer 164. Hereinafter, the operations of the rule optimizers 162 and 164 will be briefly further described.

The first optimizer 162 may update a rule stored in a rule set storage 184 by analyzing the log data including the attack detection result. The updated rule 36 may be stored again in the rule set storage 184 through the storage unit 180. The log data may be obtained from a log storage 185. An optimization operation of the first optimizer 162 (i.e., log data analysis and rule update operation) may be performed periodically or repeatedly based on a condition (e.g., a detection rate for a domain being below a reference value, based on an increasing or decreasing trend of a detection rate for a domain decreasing, etc.) may be satisfied. By doing so, the detection rule may be progressively optimized. In order to exclude the duplicated description, a more detailed description of the operation of the first optimizer 162 will be described later with reference to FIGS. 14 to 22.

Next, the second optimizer 164 may optimize a rule set applied to a target domain based on information 40 of a device belonging to the target domain. Here, it may be understood that the target domain refers to any domain to be optimized. The device information 40 may be provided from the detection system 20 of the target domain. The optimized rule set 38 may be transferred to the target domain and applied to the detection system 20 of the target domain. An optimization operation of the second optimizer 164 (i.e., device information acquisition and rule set update operation) may be performed periodically or repeatedly based on a condition (e.g., a detection rate of the target domain being lower than a reference value, based on the fluctuation trend of the detection rate of the target domain being downward, a new device being added to the target domain, or the like) may be satisfied. By doing so, the rule set of the target domain may be gradually optimized. In order to exclude the duplicated description, a more detailed description of the operation of the second optimizer 164 will be described later with reference to FIG. 23.

It will be described with reference to FIG. 2 again.

The storage unit 180 may manage (e.g., store, inquire, modify, delete, etc.) various kinds of information used by the apparatus for optimizing the rule 10. The various types of information may include, for example, device information, vulnerability information, exploit information, rule set information, log data, attack type information (e.g., attack type information of exploit codes), rule set information, or the like, but are not limited thereto. The various types of information may be stored in the storages 181 to 186 managed by the storage unit 180. For efficient information management, the storages 181 to 186 may be implemented by databased storage media.

In addition, the storage unit 180 may provide information stored in each of the storages 181 to 186 to other modules 120 to 160, or may store information provided from the other modules 120-160 in corresponding storages 181-186.

Hereinafter, the detection system 20 according to some embodiments of the present disclosure will be described with reference to FIG. 5.

Figure 5:
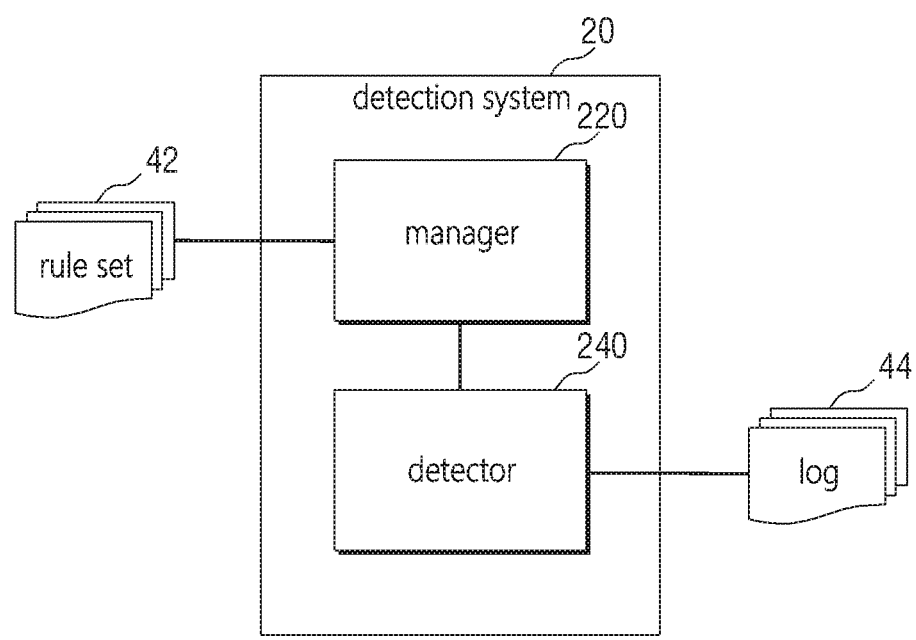
FIG. 5 is an exemplary block diagram illustrating an attack detection system according to some embodiments of the present disclosure.

FIG. 5 may be an exemplary block diagram illustrating the detection system 20 according to some embodiments of the present disclosure.

As shown in FIG. 5, the detection system 20 may include a manager 220 and a detector 240. FIG. 5 illustrates the components related to an embodiment of the present disclosure. It will be appreciated by those skilled in the art that it may further include other general purpose components in addition to the components illustrated in FIG. 2. Hereinafter, each component will be described.

The manager 220 may set, control, monitor, and/or manage various functions/operations of the detection system 20. For example, the manager 220 may receive a rule set 42 from the optimization apparatus 10 and set the rule set 42 as a detection rule of a corresponding domain. In addition, the manager 220 may monitor or control an operation of the detector 240 in real time. The manager 220 may be implemented as a management tool used by an administrator, but the technical scope of the present disclosure is not limited thereto.

Next, the detector 240 may detect an exploit attack based on the rule set 42 set by the manager 220. The detector 240 may be a kind of detection engine, and may monitor the operation and/or network traffic of devices belonging to a domain and take appropriate actions (e.g., allow, block, etc.) on the operation and/or network traffic of the device based on the rule set 42. For example, based on an exploit attack (i.e., an abnormality) being detected in the operation and/or network traffic of the device, the detector 240 may block the operation and/or network traffic of the device.

In addition, the detector 240 may log all detection operations performed based on the rule set 42 to log data 44. For example, the detector 240 may log the applied rule set and a detection result thereof in the log data 44. As described above, the log data 44 may be transferred to the optimization apparatus 10 and used for rule optimization. Based on the rule optimization being made continuously, the detection performance (e.g., detection accuracy) and the detection speed of the detector 240 may be gradually improved.

Each component illustrated in FIGS. 2 to 5 may refer to software or hardware such as a field programmable gate array (FPGA) or an application-specific integrated circuit (ASIC). However, the components are not limited to software or hardware, and may be configured to be in an addressable storage medium, or may be configured to execute one or more processors. Functions provided in the components may be implemented by more detailed components, or may be implemented as one component that performs a function by combining a plurality of components.

So far, the configuration and operation of the optimization apparatus 10 and the detection system 20 according to some embodiments of the present disclosure have been described with reference to FIGS. 2 to 5. Hereinafter, methods according to various embodiments of the present disclosure will be described in detail.

Each step of the methods may be performed by a computing device. In other words, each step of the methods may be implemented with one or more instructions executed by a processor of a computing device. All steps included in the methods may be executed by one physical computing device. However, first steps of the methods may be performed by a first computing device, and second steps of the methods may be performed by a second computing device.

In the following description, it may be assumed that each step of the methods may be performed by the optimization apparatus 10 illustrated in FIG. 1. However, for convenience of description, the description of an operation subject of each step included in the methods may be omitted.

In the following, for convenience of understanding, a method for generating a detection rule will be first described with reference to FIGS. 6 to 14, and subsequently, a method for optimizing the generated detection rule will be described with reference to FIG. 15.

Figure 6:
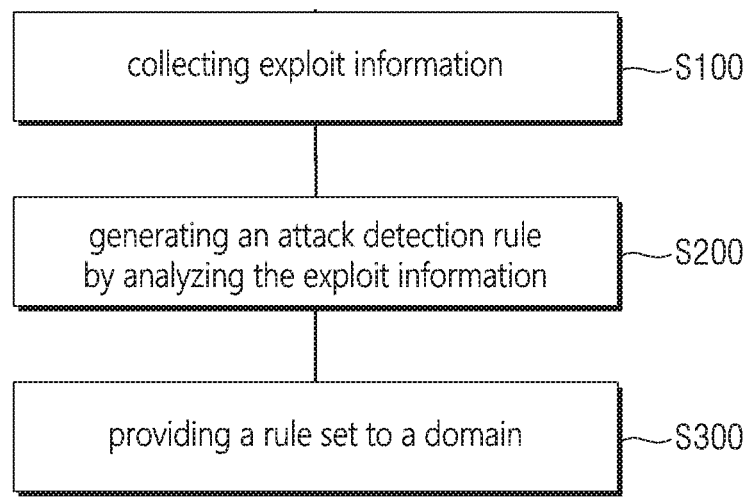
FIG. 6 is an exemplary flowchart illustrating a method for generating a rule according to some embodiments of the present disclosure.

FIG. 6 may be an exemplary flowchart illustrating a method for generating a rule according to some embodiments of the present disclosure. However, this may be an embodiment for achieving the object of the present disclosure. Naturally, some steps may be added or deleted.

As shown in FIG. 6, the method for generating the rule may start at step S100 of collecting exploit information. In this step, in addition to the exploit information, various information such as device information and vulnerability information may be collected. The detailed process of this step may be illustrated in FIG. 7.

Figure 7:
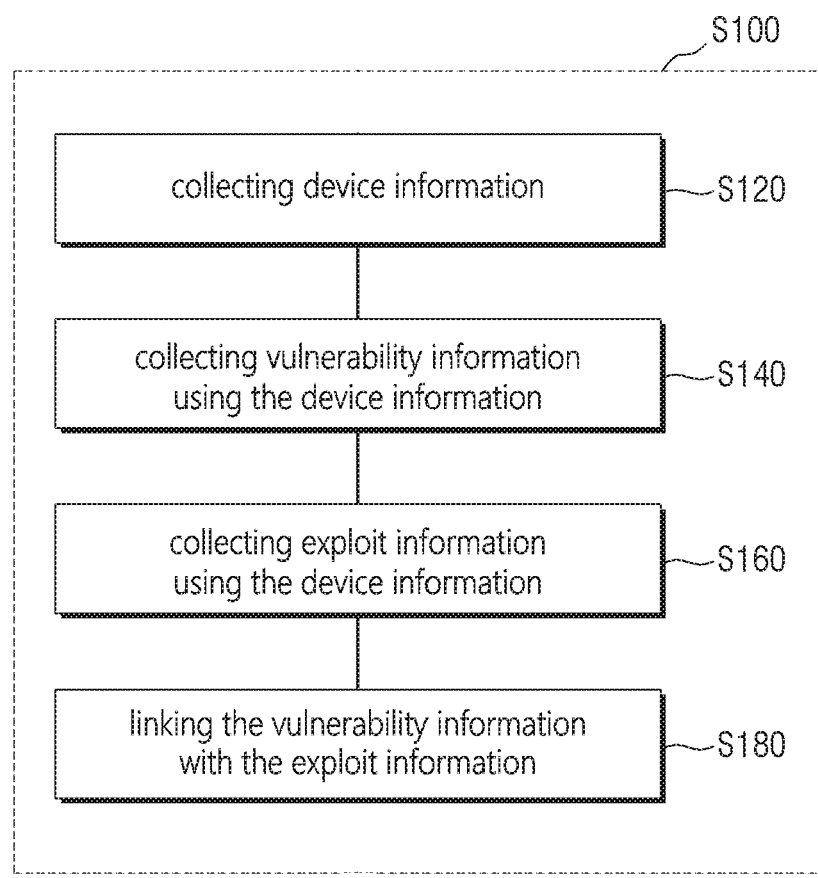
FIG. 7 is an exemplary flowchart illustrating the detailed process of a step for collecting S100 shown in FIG. 6.

As illustrated in FIG. 7, the device information may be collected first (S120). In addition, the vulnerability information and the exploit information may be collected based on the collected device information (S140 and S160). For example, by searching for a vulnerability information channel and an exploit information channel with the collected device information, vulnerability information and exploit information corresponding to a device may be collected. Through this collection manner, the vulnerability information and exploit information corresponding to the device may be efficiently collected. Next, the collected vulnerability information and exploit information may be linked to each other (S180). For example, information of first vulnerability may be stored being linked with information of a first exploit attack that exploits the first vulnerability, and information of second vulnerability may be stored being linked with information of a second exploit attack that exploits the second vulnerability.

In order to provide a more convenient understanding, an example of step S100 of collecting will be briefly described with reference to FIG. 8.

Figure 8:
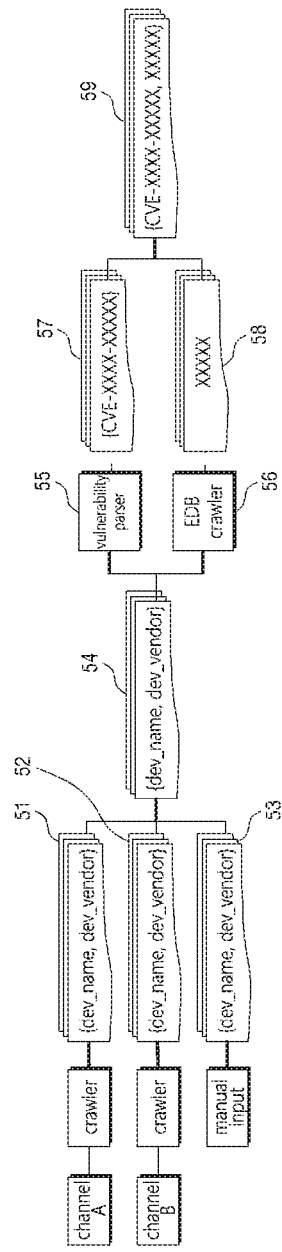
FIG. 8 is an exemplary diagram for further explaining the step for collecting S100 shown in FIG. 6.

As illustrated in FIG. 8, device information 51 and 52 may be collected from one or more channels A and B via a crawler. In addition, device information 53 known to an administrator may be collected through manual input. The collected device information 51 to 53 may be integrated.

In addition, using the integrated device information 54, a vulnerability parser 55 may collect and extract vulnerability information 57. For example, the vulnerability parser 54 may collect CVE information, and extract the vulnerability information 57 associated with device information 55 from the collected information.

In addition, an EDB crawler 56 may collect exploit information 58 associated with the device information 54 on an EDB website. The exploit information 58 may be linked with the vulnerability information 57 to form link information 59, and the link information 59 may be stored in a storage.

FIG. 9 illustrates the type of collection information 62 that may be referenced in various embodiments of the present disclosure. As illustrated in FIG. 9, the information 62 collected in the manner described above may include device information including a device name (dev_name) and a manufacturer (dev_vendor), vulnerability information including a CVE identifier (CVE_number) and CVE details (CVE info), an EDB reference number (or identifier; EDB number), basic info of a corresponding exploit (Exploit info), and exploit information including codes of a corresponding exploit (Exploit file).

FIG. 10 shows an example of collection information 64 that may be referenced in various embodiments of the present disclosure. For example, FIG. 10 illustrates a case where a device may be a GPON router manufactured by Dasan, and an identifier of CVE information associated with the GPON router may be "CVE-2018-35061." FIG. 10 also illustrates actual codes of an exploit attack associated with the CVE information ("CVE-2018-35061").

It will be described with reference to FIG. 6 again.

In step S200, an attack detection rule may be generated by analyzing the exploit information. The detailed process of this step may be shown in FIG. 11.

Figure 11:
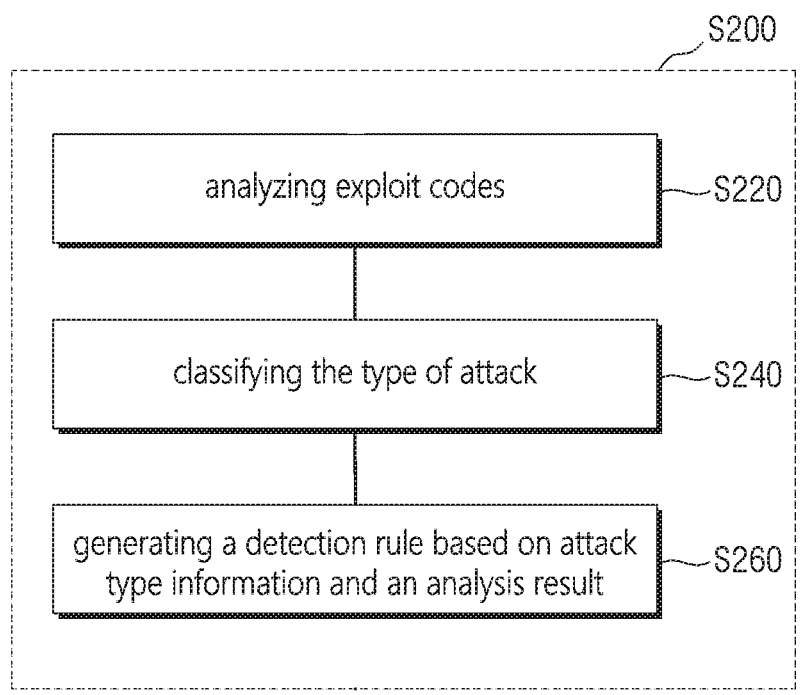
FIG. 11 is an exemplary flowchart illustrating the detailed process of a step for generating a rule S200 shown in FIG. 6.

As shown in FIG. 11, a pattern or signature that may detects an exploit attack may be extracted by analyzing the exploit codes, and the type of the exploit attack may be classified. In addition, the detection rule may be generated using an analysis result (e.g., signature or pattern) and attack type information of the exploit codes (S220 to S260).

For example, the detection rule may be generated by using the signature extracted through code analysis as a rule detection condition and defining an action of the rule depending on the risk of the attack derived through the attack type information. However, the method for generating the detection rule is not limited thereto, and one or more rule generation algorithms well known in the art may be utilized.

FIGS. 12 to 13 illustrate a rule format 72 and an action field definition 74 that may be referenced in various embodiments of the present disclosure, which may be defined based on rule format used in attack detection systems such as Snort or Suricata. In the rule format 72 illustrated in FIG. 12, "action" of a rule header means an action performed as a rule condition may be satisfied, and at least some fields of the rule header or rule option may constitute a rule condition. Since those skilled in the art will already be familiar with the rule format of the attack detection system, a detailed description thereof will be omitted.

FIG. 13 illustrates a case in which three actions may be set in an action field, but the number and type of actions may vary.

FIG. 14 shows an example of a detection rule 76 generated by analyzing the exploit codes illustrated in FIG. 10. For example, FIG. 14 illustrates an actual rule for detecting an exploit attack that exploits vulnerabilities of the GPON router of Dasan ("CVE-2018-35061"). Since those skilled in the art will be able to clearly understand such a detection rule, a detailed description thereof will be omitted.

The description will be continued with reference to FIG. 6 again.

In step S300, the generated rule set may be provided to the domain 30. In other words, a rule set for detecting an exploit attack may be provided to the detection system 20 of the domain.

In some embodiments, optimization for the rule set may be performed and the optimized rule set may be provided to the domain. Here, the optimization may be performed for each domain. For example, a first rule set optimized for a first target domain may be provided to the first target domain, and a second rule set optimized for a second target domain may be provided to the second target domain. A method for optimizing will be described in detail with reference to FIGS. 15 to 23.

For reference, step S100 may be performed by the collector 120, step S200 may be performed by the rule generator 140, and step S300 may be performed by the rule generator 140 or the rule optimizer 160.

So far, the method for generating the rule according to some embodiments of the present disclosure has been described with reference to FIGS. 5 to 14. According to the method described above, vulnerability information on a device and exploit information thereof may be automatically collected based on device information. And, by analyzing the collected information, a rule set for automatically detecting an exploit attack may be generated and delivered to each domain. Such a series of processes may be performed in an automated manner, thereby greatly reducing the human and time costs of domain security. In addition, a rule generation and update process may be continuously performed, so that based on a new exploit attack emerging, an immediate rule update may be made.

Hereinafter, a method for optimizing a rule according to some embodiments of the present disclosure will be described with reference to FIGS. 15 to 23.

Figure 15:
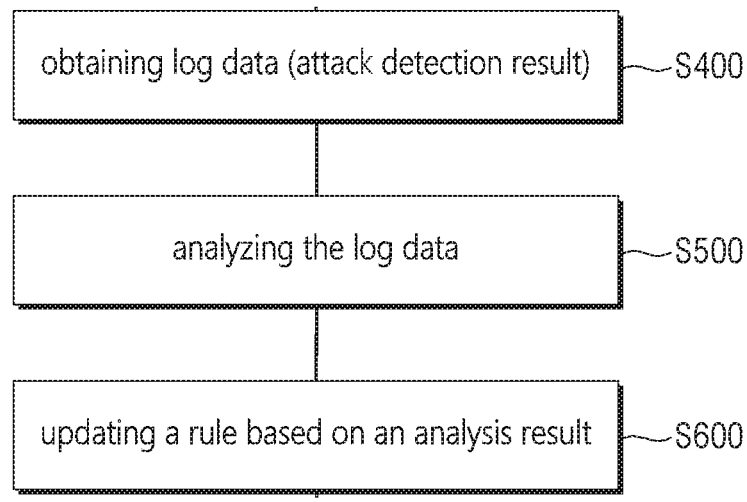
FIG. 15 is an exemplary flowchart illustrating a method for optimizing a rule according to a first embodiment of the present disclosure.

FIG. 15 may be an exemplary flowchart illustrating a method for optimizing a rule according to a first embodiment of the present disclosure. However, this may be an embodiment for achieving the object of the present disclosure. Naturally, some steps may be added or deleted.

As shown in FIG. 15, the method for optimizing the rule may be started in step S400 of obtaining log data including an attack detection result. In this step, the detection system 20 may provide the optimization apparatus 10 with logged data in a process of detecting the exploit attack.

The log data includes the attack detection result, and for example, may include detection results such as true positives, false negatives, or false positives, rule information applied to detection, or the like. In addition, since the log data may be time-series data, the log data may further include time information such as a time stamp.

An exemplary format 82 and example 84 of log data may be shown in FIGS. 16 and 17. The log format 82 illustrated in FIG. 16 may be defined based on a log format of attack detection systems such as Snort and Suricata. Since those skilled in the art will clearly understand the meaning of each field constituting the log data, a detailed description thereof will be omitted.

Figure 18:
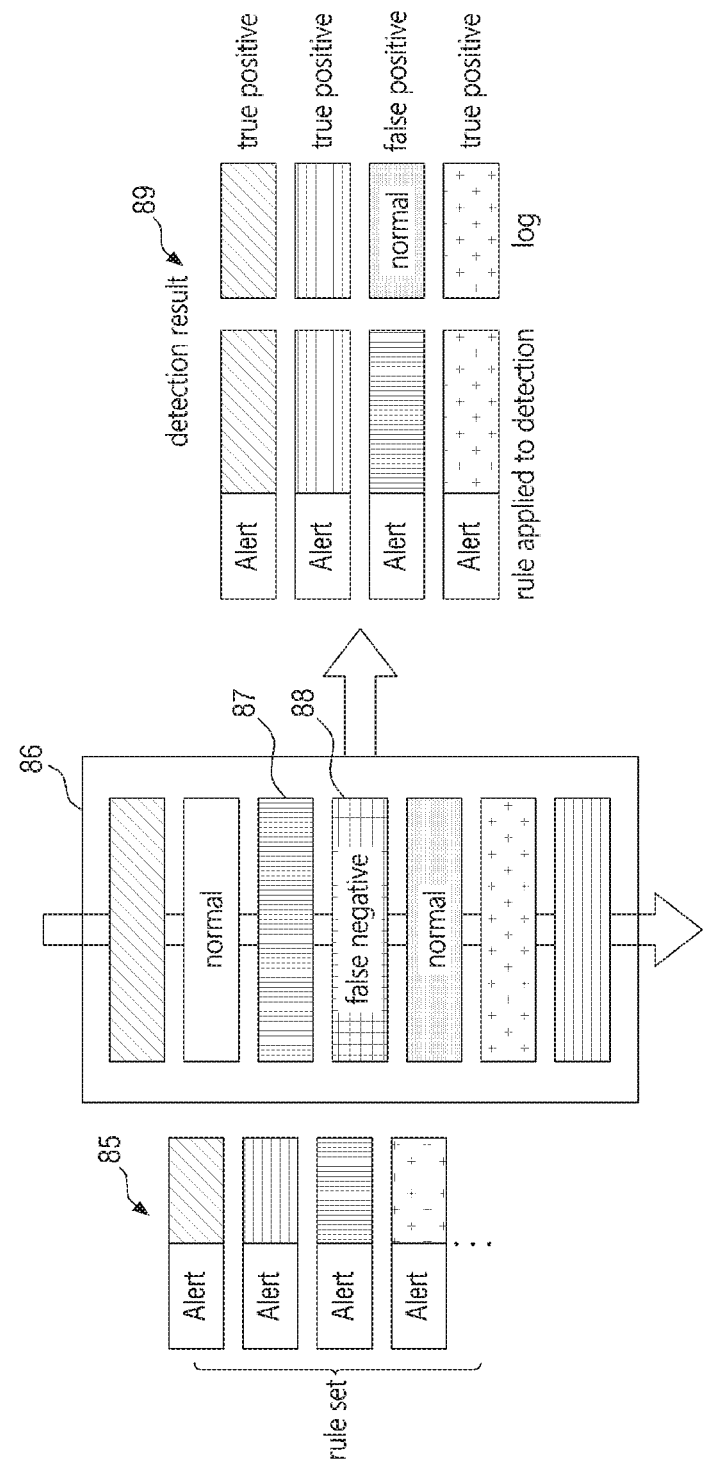
FIG. 18 is an exemplary diagram for further explaining the method for optimizing the rule according to the first embodiment of the present disclosure.
Figure 19:
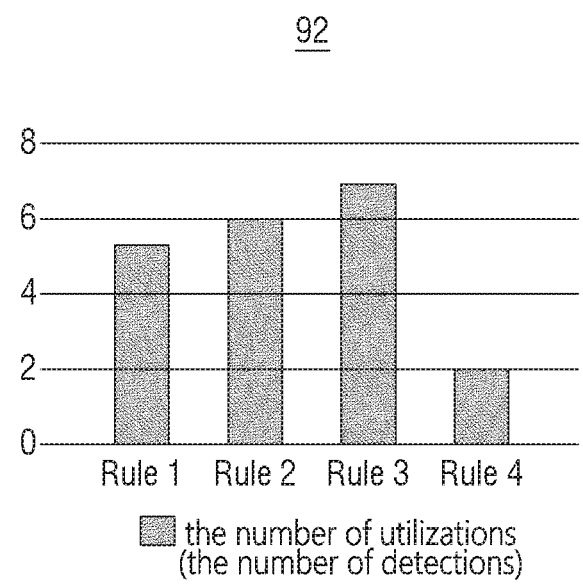
FIGS. 19 to 22 illustrate analysis results of log data that may be referenced in various embodiments of the present disclosure.
Figure 20:
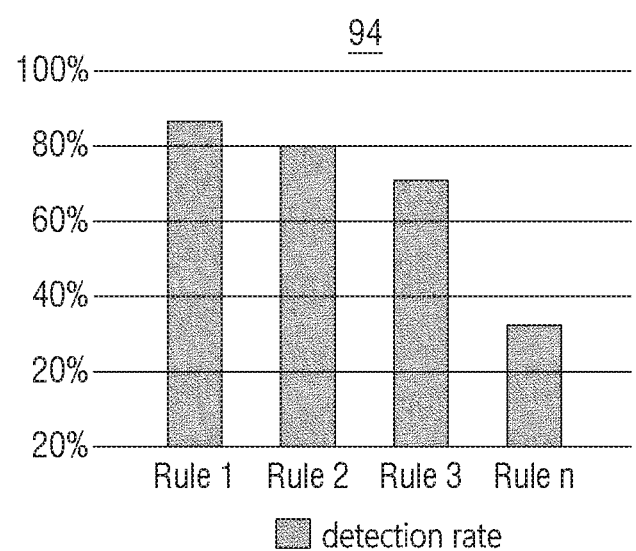
Figure 21:
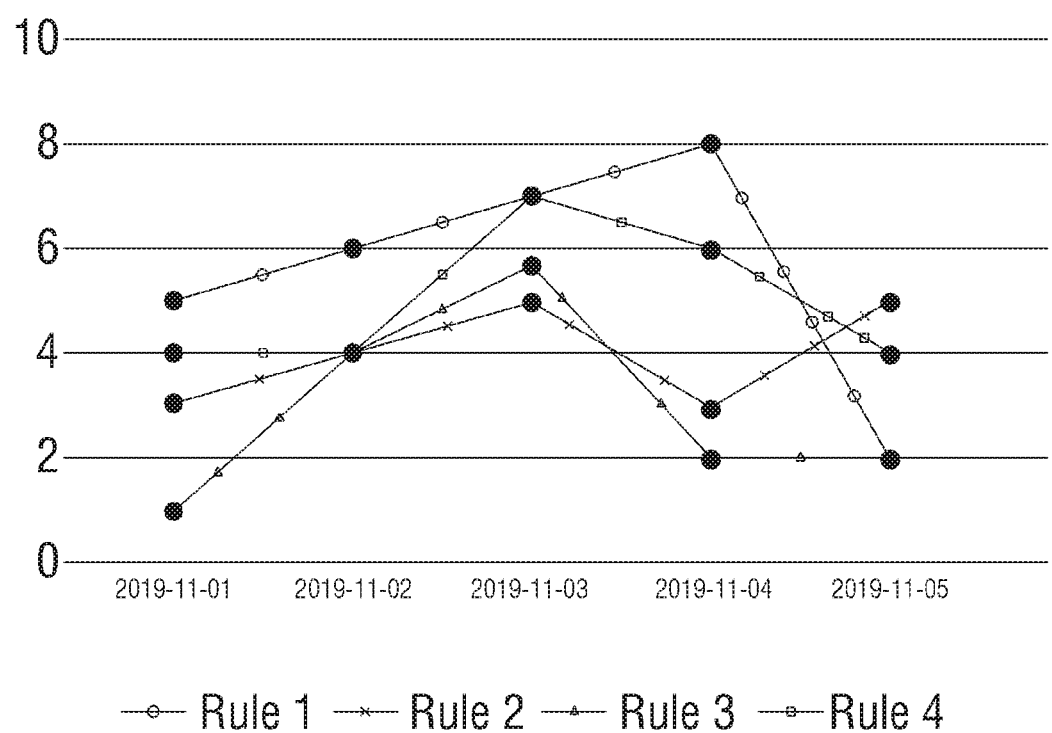
Figure 22:
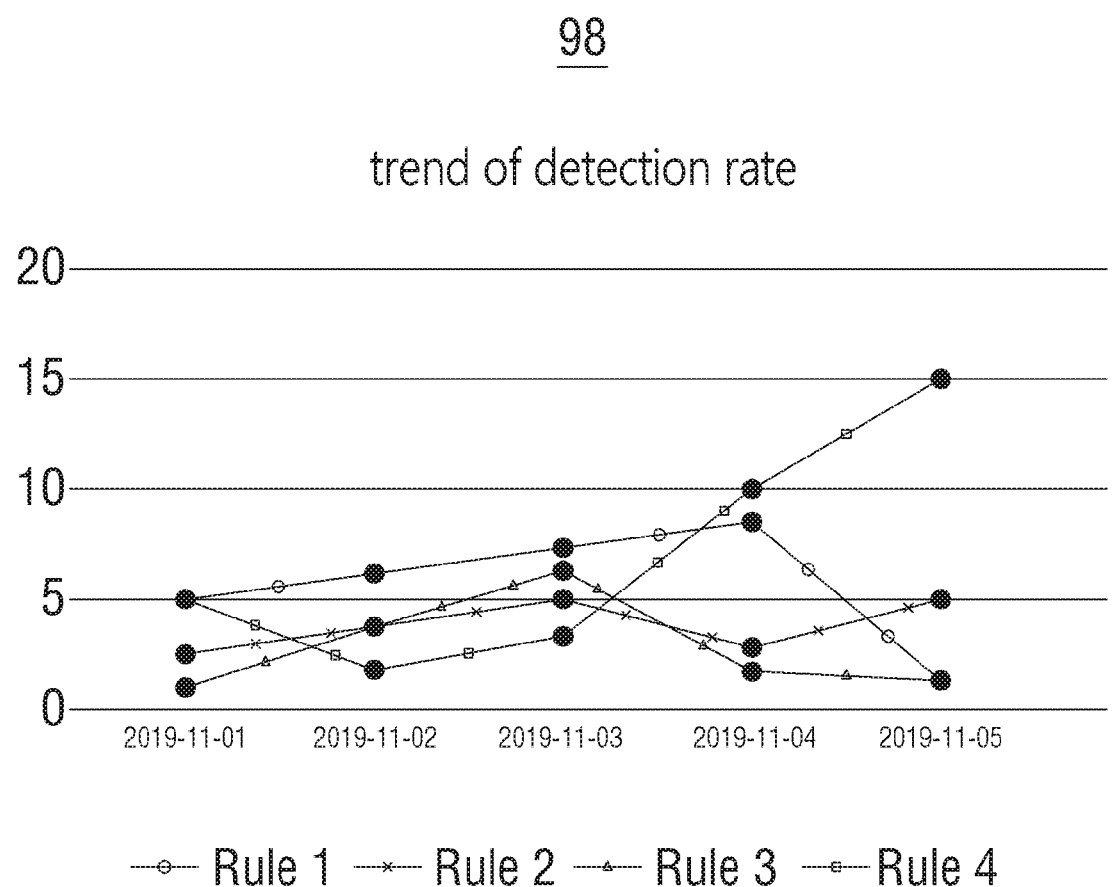

FIG. 18 illustrates a rule set 85 applied to attack detection and a detection result 89 thereof. For example, FIG. 18 illustrates that the attack detection may be performed on a plurality of packets 86 based on the rule set 85, in which an action of a rule may be all "Alert," and packets (e.g., 87 and 88) and rules associated with each other may be shown in the same pattern.

As illustrated in FIG. 18, although a first packet 87 should be determined to be abnormal according to the rule, it may be determined to be normal and recorded as a false positive. Also, a second packet 88 was recorded as a false negative because no associated rule was defined. Such detection result 89 may be provided to the optimization apparatus 10 and used for the rule optimization. For example, rule deletion, rule modification, or new rules addition may be made to prevent false positives. As another example, a new rule may be added or an existing rule may be modified to prevent false negatives.

It will be described with reference to FIG. 15 again.

In step S500, analysis on the log data may be performed. For example, the analysis may include, but is not limited to, time-series analysis, true positive rate (detection rate) analysis, false detection rate analysis, false negative rate analysis, the number of detection analysis, or the like. The analysis may be performed for each device or domain, and may be performed for the entire device or domain.

In this step, as a result of the analysis, various information such as the number of detections of a rule (i.e., the number of detected attacks), a detection rate, trend Information on the number of detections or the detection rate, the number of true positives, the number of false positives, the number of false negatives, or the like may be derived. Various examples of the analysis result may refer to graphs 92 to 98 shown in FIGS. 19 to 22.

In step S600, the rule may be updated based on the analysis result. In this step, the way of updating a rule may vary depending on embodiments.

In some embodiments, a rule may be updated based on the number of true positives or a true positive rate. For example, based on the number of true positives (number of detections) or the true positive rate (detection rate) of a rule calculated by analyzing log data being greater than or equal to a reference value, action information of a corresponding rule may be changed. As another example, based on the number of true positives (number of detections) or the true positive rate (detection rate) being greater than or equal to the reference value, an action level of a corresponding rule may be raised (e.g., alert → drop). This may be because an attack that may be continuously detected for a certain period of time may be the most prevalent attack, and may be likely to be a high-risk attack. As another example, based on the number of true positives (number of detections) or the true positive rate (detection rate) being greater than or equal to the reference value, the priority of applying a corresponding rule may be increased. Here, the priority of application may mean the order in which a rule may be applied based on an attack (packet) being detected, in which it may be understood that a rule with the higher priority may be first applied. According to this example, a rule having a high true positive rate may be first applied based on detecting an attack, so that a detection speed for an exploit attack may be improved.

In the embodiment described above, the reference value may be a predetermined fixed value or a changeable variation value that varies depending on a situation. For example, the reference value may be a fixed value set by an administrator. For another example, the reference value may be a variation value that varies depending on security importance of a domain, a size of a domain (i.e., the number of devices belonging to a domain), or the like. The technical idea of the reference value may be applied to the embodiments described below.

In some embodiments, a rule may be updated based on the number of false positives or a false positive rate. For example, based on the number of false positives or the false positive rate of a rule calculated by analyzing log data being greater than or equal to a reference value, a corresponding rule may be deleted or designated as a target of modification. A rule designated as a modification target may be provided to an administrator, and the rule may be reviewed. According to the present embodiment, a rule set applied to the attack detection system may be reduced in weight by deleting a rule that has low attack detection performance. The detection speed for an exploit attack may be improved, and resources required for attack detection may be reduced. In addition, the false positive rate may be improved, and inefficient resource waste due to the false positive may be prevented. In addition, a rule designated as a modification target may be reviewed by the administrator, thereby greatly reducing the burden on the administrator.

In some embodiments, a rule may be updated based on a time-series analysis result for log data. Here, the time-series analysis result may include, for example, a trend analysis result (See FIGS. 21 and 22) such as an increasing or decreasing trend of the number of detections and an increasing or decreasing trend of a detection rate (true positive rate). Examples of the present embodiment may be as follows.

For example, action information of a rule in which the trend of the number of detections may be increasing may be changed. As another example, based on the trend on the number of detections increasing, an action level of a corresponding rule may be raised (e.g., alert → drop). This may be because an attack that may be increasing in the number of detections may be a popular attack scheme, and may be likely to be a high-risk attack. In addition, an upward degree of the action level may be determined based on a slope of the increasing trend. For example, based on the slope being greater than or equal to a reference value (e.g., based on the number of detections increasing steeply), the action level of the rule may be increased by one or more steps. In the opposite case (i.e., based on a decreasing trend), the action level of the rule may be lowered (e.g., drop → alert).

As another example, an application priority of the rule, in which the trend of the number of detections may be increasing, may be raised. Here, a degree of priority increase may be determined based on the slope of the increasing trend. For example, based on the slope being greater than or equal to the reference value (e.g., based on the number of detections increasing steeply), the application priority of the rule may be raised further. In the opposite case (i.e., based on the decreasing trend), the application priority of the rule may be lowered. According to this example, a rule in which the number of detections may be increasing may be applied first based on detecting an attack, thereby improving a detection speed for an exploit attack.

As another example, a rule in which the trend of the number of detections decreases may be deleted or designated as a modification target. A rule designated as a modification target may be provided to an administrator, and the rule may be reviewed. According to the present example, by deleting a rule that may not be used for detection continuously for a certain period of time, a rule set applied to the attack detection system may be reduced in weight. In some examples, before deleting the rule, analysis on an operating state of an associated device may be made. Here, the associated device may refer to a device having a vulnerability associated with the rule (i.e., a vulnerability exploited by a detection target attack). As a result of the analysis, based on the associated device being in an inactive state for a certain period and the period in which the trend of the number of detections decreases corresponds to a period of the inactive state, deletion of the rule may be suspended.

As another example, action information of a rule in which a trend of a detection rate may be increasing may be changed. As another example, based on the trend for the detection rate increasing, an action level of a corresponding rule may be increased (e.g., alert → drop). In addition, an upward degree of the action level may be determined based on a slope of the increasing trend. For example, based on the slope being greater than or equal to a reference value (e.g., based on the detection rate increasing steeply), the action level of the rule may be increased by one or more steps. In the opposite case (i.e., based on a decreasing trend), the action level of the rule may be lowered (e.g., drop → alert).

As another example, an application priority of the rule, in which the trend of the number of detections may be increasing, may be raised. Here, a degree of priority increase may be determined based on the slope of the increasing trend. For example, based on the slope being greater than or equal to the reference value (e.g., the number of detections increases steeply), the application priority of the rule may be raised further. In the opposite case (i.e., based on the decreasing trend), the application priority of the rule may be lowered.

As another example, a rule in which the trend of the detection rate decreases may be deleted or designated as a modification target. A rule designated as a modification target may be provided to an administrator, and the rule may be reviewed.

For reference, steps S400 to S600 may be performed by the first rule optimizer 162.

So far, the method for optimizing the rule according to the first embodiment of the present disclosure has been described with reference to FIGS. 15 to 22. According to the method described above, a previously applied rule (or rule set) may be updated by analyzing the log data including the attack detection result. The detection accuracy and detection speed for the exploit attack may be gradually improved.

The method for optimizing the rule according to the first embodiment described above may be performed irrespective of domains, or may be performed for each domain. For example, log data of a plurality of domains may be analyzed to update an existing rule regardless of the domains. The updated rule may be transferred to a domain being applied. As another example, a rule applied to a target domain may be updated by using log data of the target domain.

Also, in some embodiments, a detection rule applied to a second domain may be updated using log data of a first domain. Here, the first domain may be a domain whose similarity with the second domain may be greater than or equal to a reference value (i.e., a similar domain). The similarity between domains may be determined based on the similarity of devices belonging to each domain. Devices with similar manufacturers or operating systems would have similar vulnerabilities. Domains with similar devices may be likely to have similar rule sets and security vulnerabilities. Log data of similar domains may be effectively utilized to update rules of other domains. According to the present embodiment, since the amount of log data may be increased so that the influence of noise may be minimized, the accuracy of a log data analysis result may be improved, and the effect of rule optimization may be improved.

In the embodiment described above, the log data of the first domain may be used based on the amount of log data of the second domain being less than a reference value. Based on updating a rule of a target domain, it may be desirable to use log data of a corresponding domain. However, based on waiting for enough log data to accumulate, the rule update may be delayed, exposing it to a new exploit attack. Further, based on updating a rule without having accumulated enough log data, the rule may not be updated correctly, so a domain may be less secure. To solve this problem, the rule of the target domain may be updated at a predetermined interval, based on there not being enough log data at the time of update, the rule may be updated by utilizing log data of similar domains together. In addition, based on the log data being sufficient at the time of updating, the rule of the target domain may be updated using the log data of the target domain.

Hereinafter, a method for optimizing a rule according to a second embodiment of the present disclosure will be described with reference to FIG. 23.

Figure 23:
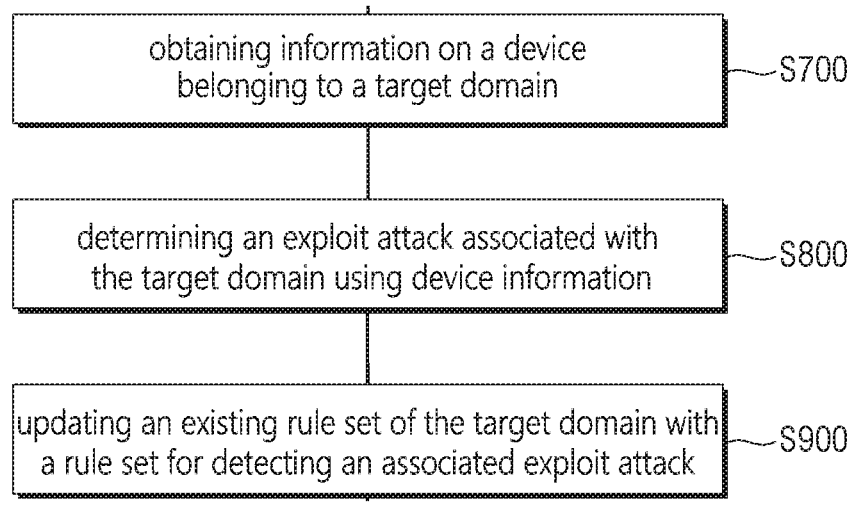
FIG. 23 is an exemplary flowchart illustrating a method for optimizing a rule according to a second embodiment of the present disclosure.

FIG. 23 may be an exemplary flowchart illustrating the method for optimizing the rule according to the second embodiment of the present disclosure. However, this may be an embodiment for achieving the object of the present disclosure. Naturally, some steps may be added or deleted.

As shown in FIG. 23, the method for optimizing the rule may be started in step S700 of obtaining information on a device belonging to a target domain. In this step, the detection system 20 may identify the device belonging to the target domain, and provide information (e.g., a name, a manufacturer, etc.) of the identified device to the optimization apparatus 10. In addition, the optimization apparatus 10 may update the storage e.g., 181 based on device information of the target domain.

In some embodiments, the device information of the target domain and device information stored in the storage (e.g., 181) may be compared. As a result of the comparison, based on determining that a new device exists in the target domain, device information, vulnerability information, and exploit information on the new device may be additionally collected. In addition, a new detection rule may generate by analyzing the exploit information associated with the new device, and a rule set of the target domain may be updated to include the new detection rule. According to the present embodiment, as a detection rule associated with a vulnerability of the new device may be automatically updated, the security of the target domain may be improved.

In addition, in some embodiments, the device information of the target domain may be used to determine whether there may be a device excluded from the target domain or that has not operated for a predetermined time. In addition, in response to determining that the device exists, a rule associated with a vulnerability of the device may be removed from an existing rule set of the target domain. According to the present embodiment, as a detection rule associated with an inactive device or a device excluded (withdrawn) from the target domain may be automatically removed, a rule set applied to the target domain may be reduced in weight.

In step S800, an exploit attack associated with the target domain may be determined using the device information. For example, the device information may be used to determine vulnerability information on a device belonging to the target domain and an exploit attack associated with it. The vulnerability information and the exploit attack may be determined by inquiring the storage (e.g., 181 to 186).

In step S900, a rule set for detecting an exploit attack of the target domain may be determined, and the existing rule set of the target domain 30 may be updated with the determined rule set.

For reference, steps S700 to S900 may be performed by the second rule optimizer 164.

So far, the method for optimizing the rule according to the second embodiment of the present disclosure has been described with reference to FIG. 23. According to the method described above, a rule set that may be optimized (specialized) according to characteristics of the target domain (e.g., the number, type, etc. of devices belonging to) may be provided to the target domain and used for attack detection. For example, a rule set for exploit attacks that may be highly associated with the target domain may be enhanced, and a rule set for exploit attacks that may be less associated with the target domain may be reduced in weight. The detection performance and detection efficiency of the rule set may be increased, and the security of the target domain may be improved. In other words, by providing a rule set specialized to the target domain, accurate and rapid attack detection may be achieved with a light weight rule set.

Figure 24:
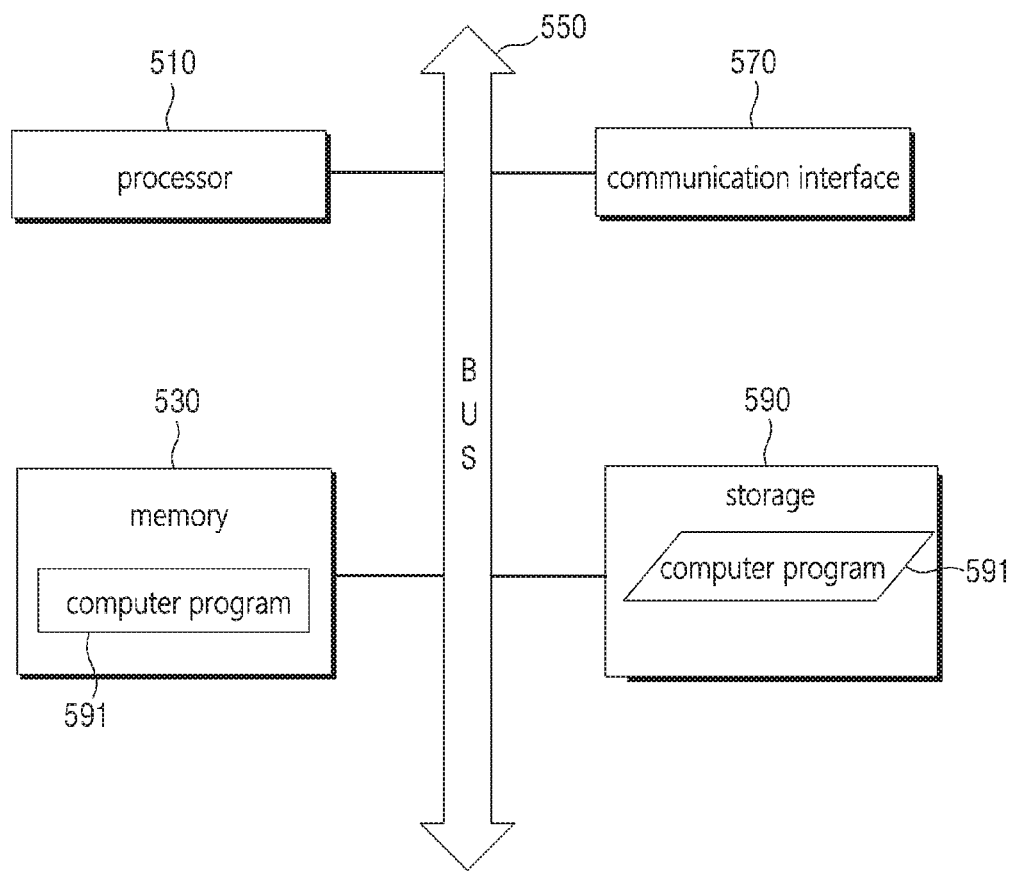
FIG. 24 shows an example computing device capable of implementing an apparatus/system according to various embodiments of the present disclosure.

FIG. 24 may be an example hardware diagram illustrating a computing device 500.

As shown in FIG. 24, the computing device 500 may include one or more processors 510, a bus 550, a communication interface 570, a memory 530, which loads a computer program 591 executed by the processors 510, and a storage 590 for storing the computer program 591. However, FIG. 24 illustrates the components related to the embodiment of the present disclosure. It will be appreciated by those skilled in the art that the present disclosure may further include other general purpose components in addition to the components shown in FIG. 24.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, based on the computer program 591 being loaded into the memory 530, the logic (or the module) as shown in FIG. 24 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure may be implemented. Based on the computer program 591 being loaded on the memory 530, the processor 510 may perform the methods/operations in accordance with various embodiments of the present disclosure by executing the one or more instructions.

For example, a computer program 591 may include instructions for performing an operation of obtaining log data including a result of detecting an exploit attack based on a rule, an operation of time-series analyzing the obtained log data, and an operation of updating at least some of applied detection rules based on the analysis result. In such a case, the optimization apparatus 10 according to some embodiments of the present disclosure may be implemented via a computing device 500.

As another example, the computer program 591 may include instructions for performing an operation of obtaining information on a device belonging to a target domain, an operation of determining an exploit attack associated with the device using the obtained device information, and an operation of updating an existing rule set of the target domain with a rule set for detecting the determined exploit attack. In such a case, the optimization apparatus 10 according to other some embodiments of the present disclosure may be implemented via the computing device 500.

As another example, the computer program 591 may include instructions for performing an operation of being provided with a rule set from the optimization apparatus 10, an operation of detecting an exploit attack against a device belonging to a domain by applying the provided rule set, and an operation of logging a result of the detection and transferring the logged data to the optimization apparatus 10. In such a case, the detection system 20 according to some embodiments of the present disclosure may be implemented via the computing device 500.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations may be shown in an order in the drawings, those skilled in the art will appreciate that many variations and modifications can be made to the embodiments without substantially departing from the principles of the presently disclosed concept. The disclosed embodiments of the presently disclosed concept may be used in a generic and descriptive sense and not for purposes of limitation. The scope of protection of the presently disclosed concept should be interpreted by the following claims, and all technical ideas within the scope equivalent thereto should be construed as being included in the scope of the technical idea defined by the present disclosure.

What is claimed is:

1. An apparatus for optimizing a rule, comprising:
a memory to store a rule optimizer;
a processor to execute the rule optimizer to:
obtain log data including a result of detecting an exploit attack based on the rule;
time-series analyze the obtained log data;
derive increasing or decreasing trends for detection rates of previously applied detection rules;
raise a priority of application of one of the previously applied detection rules in which the derived trend of the detection rate is the increasing trend;
update at least some of the previously applied detection rules applied to a second domain by using log data of a first domain, the first domain having a similarity with the second domain greater than a reference value,
wherein the similarity is determined based on a similarity between information on a first device belonging to the first domain and information on a second device belonging to the second domain,
wherein the information on the first device and the second device include at least one of a device name, a manufacturer, an operating system, and a firmware.

2. The apparatus of claim 1, wherein the memory further stores a collector and a rule generator,
wherein the processor further executes the collector to collect vulnerability information on a device and exploit information associated with the vulnerability information, and
wherein the processor further executes the rule generator to generate the previously applied detection rules by analyzing the collected exploit information.

3. The apparatus of claim 2, wherein the processor further executes the collector to
collect device information; and
collect the vulnerability information and the exploit information associated with the device by using the collected device information.

4. The apparatus of claim 2, wherein the exploit information includes exploit codes, and
wherein the processor further executes the rule generator to
classify the type of attack associated with the exploit codes by analyzing the exploit codes; and
generate the previously applied detection rules by using an analysis result and a classification result of the exploit codes.

5. The apparatus of claim 1, wherein the previously applied detection rules comprise action information performed based on satisfying a condition, and
wherein the processor further executes the rule optimizer to
calculate a number of true positives or true positive rates of the previously applied detection rules by analyzing the obtained log data; and
change action information of one of the previously applied detection rules in which the calculated number of true positives or the true positive rates is greater than or equal to a reference value.

6. The apparatus of claim 1, wherein the processor further executes the rule optimizer to
calculate a number of true positives or true positive rates of the previously applied detection rules by analyzing the obtained log data; and
raise a priority of application of one of the previously applied detection rules in which the calculated number of true positives or the true positive rates is greater than or equal to a reference value.

7. The apparatus of claim 1, wherein the processor further executes the rule optimizer to
calculate a number of false positives or false positive rates of the previously applied detection rules by analyzing the obtained log data; and
delete or modify one of the previously applied detection rules in which the calculated number of false positives or the false positive rates is greater than or equal to a reference value.

8. The apparatus of claim 1, wherein the previously applied detection rules comprise action information performed based on satisfying a condition, and
wherein the processor further executes the rule optimizer to
derive an increasing or decreasing trend for a number of detections for each of the previously applied detection rules by time-series analyzing the obtained log data; and
change action information of one of the previously applied detection rules in which the derived trend of the number of detections is the increasing trend.

9. The apparatus of claim 1, wherein the processor further executes the rule optimizer to
time-series derive an increasing or decreasing trend for a number of detections for each of the previously applied detection rules by analyzing the obtained log data; and
raise a priority of application of one of the previously applied detection rules in which the derived trend of the number of detections is the increasing trend.

10. The apparatus of claim 1, wherein the processor further executes the rule optimizer to
derive an increasing or decreasing trend for a number of detections for each of the previously applied detection rules by time-series analyzing the obtained log data; and
delete or modify one of the previously applied detection rules in which the derived trend of the number of detections is the decreasing trend.

11. The apparatus of claim 1, wherein the previously applied detection rules comprise action information performed based on satisfying a condition, and
wherein the processor further executes the rule optimizer to
derive increasing or decreasing trends for detection rates of the previously applied detection rules by time-series analyzing the obtained log data; and
change action information of one of the previously applied detection rules in which the derived trend of the detection rate is the increasing trend.

12. The apparatus of claim 1, wherein the processor further executes the rule optimizer to
derive increasing and decreasing trends for detection rates of the previously applied detection rules by time-series analyzing the obtained log data; and
delete or modify one of the previously applied detection rules in which the derived trend of the detection rate is the decreasing trend.

13. The apparatus of claim 1, wherein in response to determining that an amount of log data of the second domain is less than a reference value, the processor further executes the rule optimizer to use the log data of the first domain.

14. An apparatus for optimizing a rule, comprising:
a memory to store a rule optimizer;
a processor to execute the rule optimizer to:
obtain device information associated with a device belonging to a target domain;
determine an exploit attack associated with the device by using the obtained device information;
derive increasing or decreasing trends for detection rates of previously applied detection rules by time-series analyzing the obtained device information;
raise a priority of application of one of the previously applied detection rules in which the derived trend of the detection rate is the increasing trend;
update an existing rule set of the target domain with a rule set for detecting the determined exploit attack based on at least characteristics of the target domain, and
update at least some of the previously applied detection rules applied to a second domain by using log data of a first domain, the first domain having a similarity with the second domain greater than a reference value,
wherein the similarity is determined based on a similarity between information on a first device belonging to the first domain and information on a second device belonging to the second domain,
wherein the information on the first device and the second device include at least one of a device name, a manufacturer, an operating system, and a firmware.

15. The apparatus of claim 14, wherein the memory further stores a collector,
wherein the processor further executes the collector to collect exploit information associated with vulnerability information, and
wherein the processor further executes the rule optimizer to
inquire a subset of the collected vulnerability information on the device by using the obtained device information; and
determine the exploit attack associated with the device by using the inquired subset of the collected vulnerability information.

16. The apparatus of claim 14, wherein the memory further stores a collector and a rule generator,
wherein the processor further executes the collector to collect exploit information associated with vulnerability information;
wherein the processor further executes the rule generator to generate a detection rule by analyzing the collected exploit information,
wherein in response to determining that a new device exists in the target domain, the processor further executes the collector to collect vulnerability information and exploit information associated with the new device,
wherein the processor further executes the rule generator to generate a new detection rule by analyzing the exploit information associated with the new device, and
wherein the processor further executes the rule optimizer to update the existing rule set to include the generated new detection rule.

17. A method for optimizing a rule, the method being performed by a computing device, and comprising:
obtaining log data including a result of detecting an exploit attack based on the rule;
time-series analyzing the obtained log data;
derive increasing or decreasing trends for detection rates of previously applied detection rules;
raise a priority of application of one of the previously applied detection rules in which the derived trend of the detection rate is the increasing trend;
updating at least some of the previously applied detection rules applied to a second domain by using log data of a first domain, the first domain having a similarity with the second domain greater than a reference value,
wherein the similarity is determined based on a similarity between information on a first device belonging to the first domain and information on a second device belonging to the second domain,
wherein the information on the first device and the second device include at least one of a device name, a manufacturer, an operating system, and a firmware.

* * * * *